United States Patent

[11] 3,619,768

| [72] | Inventor | Robert B. Harte<br>Taylor, Mich. |
|---|---|---|
| [21] | Appl. No. | 721,388 |
| [22] | Filed | Apr. 15, 1968 |
| [45] | Patented | Nov. 9, 1971 |
| [73] | Assignee | Buhr Machine Tool Corporation |

[54] APPARATUS FOR DETERMINING THE LOCATION OF A FAILURE IN A SERIES RELAY CIRCUIT AND THE TYPE OF FAILURE
4 Claims, 1 Drawing Fig.

[52] U.S. Cl................................................. 324/28,
317/135, 340/256
[51] Int. Cl................................................. G01r 31/02
[50] Field of Search........................................ 324/28, 28
SE; 340/415, 256; 317/123, 135, 136

[56] References Cited
UNITED STATES PATENTS

| 2,900,628 | 8/1959 | Fegely............................. | 340/415 |
| 3,105,935 | 10/1963 | Sjostrom........................ | 324/28 |
| 3,217,243 | 11/1965 | Franklin......................... | 324/28 |
| 2,493,524 | 1/1950 | Bruns.............................. | 324/28 |
| 3,182,251 | 5/1965 | Fiedler........................... | 324/28 |

FOREIGN PATENTS

| 1,498,267 | 9/1967 | France........................... | 324/28 |

*Primary Examiner*—Rudolph V. Rolinec
*Assistant Examiner*—R. J. Corcoran
*Attorney*—Whittemore, Hulbert & Belknap ABSTRACT: Structure for and a method of analyzing failure of a series relay circuit is disclosed. The location of the failure of the circuit may be determined with the structure and by the method disclosed as well as the type of failure occuring. Thus, in a series relay circuit, lights are provided in conjunction with each of the contacts in the circuit and a circuit is provided associated therewith to for turning an the lights on as the relay contacts pick up and for maintaining the lights in an on condition, even though the circuit may subsequently be broken. A second light is provided in conjunction with each of the contacts in the series relay circuit, together with a circuit for lighting each of the lights in conjunction with each of the contacts positioned in the circuit after the contacts in the series relay circuit which drop out after initially picking up.

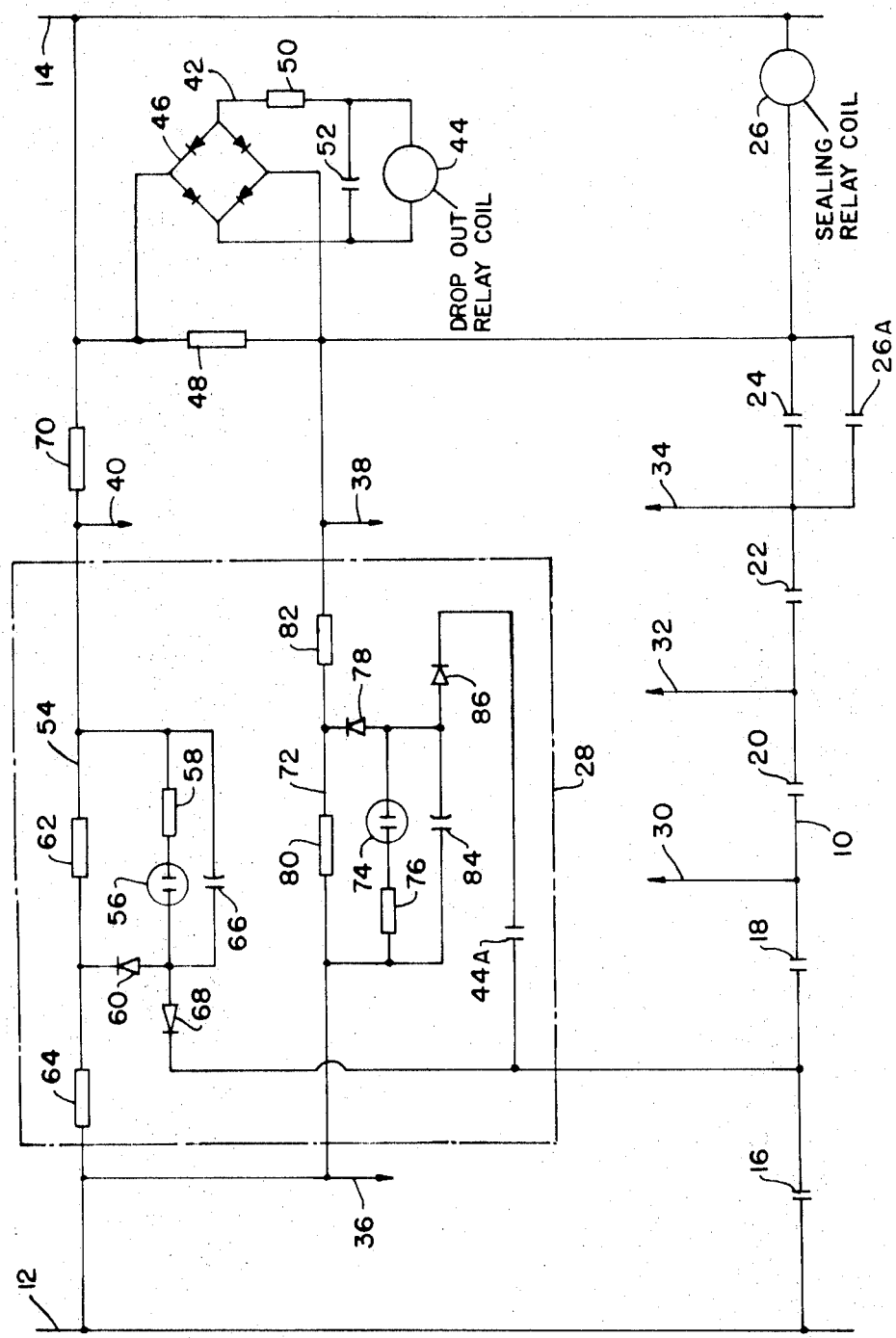

APPARATUS FOR DETERMINING THE LOCATION OF A FAILURE IN A SERIES RELAY CIRCUIT AND THE TYPE OF FAILURE

BACKGROUND OF THE INVENTION

1. Field of the Invention

The invention relates to a method of and structure for analyzing a series relay circuit and refers more specifically to determining the location of a failure in a series relay circuit and the type of failure in the circuit, including failure of contacts therein to initially pick up and dropping out of contacts after initially picking up and the structure for determining the location and type of failure in the series relay circuit.

2. Description of the Prior Art

In a series relay circuit, wherein a plurality of relay contacts are positioned in series with each other, intermittent failure of the circuit may be due to either initial failure of contacts to pick up or dropping out of contacts after initial picking up. The failing contacts can of course be located anywhere in the series circuit.

In the past there has been no adequate method of or structure for determining which of the contacts in a series relay circuit which is self-sealing initially broke the circuit, since on the initial break in the circuit the seal is broken and all of the contacts normally drop out. In the past then, analyzing of a series relay circuit to find a faulty relay has been time consuming and therefore expensive, since each of the relays in the circuit have had to be separately checked without any prior knowledge of which relay caused the seal to be broken or what the malfunction of the offending relay was.

SUMMARY OF THE INVENTION

The method of analyzing a series relay circuit in accordance with the invention includes the step of determining which relay in the series relay circuit has caused opening of the circuit. The method further includes indicating whether the contacts of the relay causing opening of the series relay circuit initially failed to pick up or dropped out after initially picking up.

The structure disclosed for effecting the method of the invention includes a separate analyzing circuit associated with each of the contacts in the series relay circuit, including a portion for indicating initial picking up of associated relay contacts and a portion for indicating subsequent dropping out of the associated relay contacts.

Separate indicating lights are provided in each of the portions of the circuits associated with the separate contacts in the series relay circuit for indicating picking up and dropping out of the relay contacts associated therewith which may be initially turned on only by an electrical signal having a predetermined magnitude applied thereacross and which remain turned on as long as an electrical signal having a lesser magnitude is applied thereacross.

BRIEF DESCRIPTION OF THE DRAWING

The FIGURE is a schematic diagram illustrating one embodiment of an electrical circuit for analyzing a series relay circuit by the method of the invention constructed in accordance with the invention.

DESCRIPTION OF THE PREFERRED EMBODIMENT

As shown in the FIGURE, the series relay circuit 10 to be analyzed is connected across the 115-volt alternating current conductors 12 and 14 and includes relays having the contacts 16, 18, 20 and 22 and relay coils (not shown) connected to be energized on initiating contacts 24 picking up. The contacts 24 and sealing relay coil 26 are positioned in series with the relay circuit 10. Relay coil 26 controls the normally open sealing relay contacts 26A which will drop out approximately 15 milliseconds after the relay coil 26 is deenergized. Thus, when the contacts 16 through 24 in the series relay circuit 10 are closed on closing of the initiating contacts 24, the sealing relay coil 26 is energized to close the sealing relay contacts 26A whereby the circuit 10 is maintained even though contacts 24 may open again.

A separate analyzing circuit 28 is connected across conductors 12 and 14 in conjunction with each of the relays having contacts 16, 18, 20 and 22 in the series relay circuit 10. Only the analyzing circuit associated with contacts 16 is illustrated in detail. The analyzing circuits for the relays including contacts 18, 20 and 22, respectively, are connected at the points 30, 32 and 34, respectively, and to the common points 36, 38 and 40, as will be understood by those in the art.

A separate energizing circuit 42 for a drop out relay coil 44 is common to all of the analyzing circuits 28 and controls relay contacts, such as 44A therein. Contacts 44A are normally open when the relay coil 44 is not energized.

Circuit 42 includes the full wave bridge rectifier 46 connected across the resistor 48 and the filter circuit, including the resistor 50 and capacitor 52 providing a rectified direct current for energizing the relay coil 44. Relay coil 44 is such that the contacts associated therewith, such as contacts 44A, will drop out approximately 12 milliseconds after the relay coil 44 is deenergized.

The pick up portion 54 of the analyzing circuit 28 includes a neon light 56 connected in series with a resistance 58 and a diode 60 in parallel with resistor 62. Resistor 62, as shown, is in series with resistor 64. Capacitor 66 is connected in parallel with the series neon light 56 and resistor 58 and the diode 68 is positioned in series between the neon light 56 and the junction between relay contacts 16 and 18 in the series relay circuit 10 to be analyzed. A single trim resistor 70 is provided in series with the analyzing circuits associated with the contacts in the series relay circuit 10 between the conductors 12 and 14, as shown.

The circuit parameters in the pickup portion 54 of the analyzing circuit 28 are such that without the contacts 16 or the sealing contacts 26A closed, the voltage across the neon light 56 is insufficient to cause the light to turn on. The voltage across the neon light 56 at this time is however sufficient to maintain the light turned on if it is initially turned on. With the relay contacts 16 closed, the voltage across the neon light 56 in the pickup portion of the analyzing circuit 28 is sufficient to cause the neon light 56 to turn on.

The drop out portion 72 of the analyzing circuit 28 again includes a neon light 74 in series with a resistor 76 and a diode 78 in parallel with the resistance 80, the resistor 80 is in series with the resistor 82, and the capacitor 84 is in parallel with the neon light 74 and resistor 76 in series, as shown. The diode 86 is connected in series with the contacts 44A and between the capacitor 84 and diode 78, as shown, while the contacts 44A are also connected to the junction between the contacts 16 and 18 of the series relay circuit 10.

The neon light 74 is such and the circuit constants in the dropout portion of the analyzing circuit 28 are chosen so that the neon light 74 will not turn on due to the usual electrical signal across the resistor 80 but will remain turned on after initial turning on. To initially turn on the light 74, the left-hand side of the light 74 is connected to the conductor 12 through the resistance 76 and the right-hand side of the light 74 is connected to the conductor 14 through the diode 86, relay contacts 44A and closed contacts 18, 20, 22 and 24 and the relay coil 26. If the relay contacts 16 are closed, the neon light 74 will not light since both sides of the neon light will be effectively connected to the conductor 12.

Thus, in overall operation, to analyze the series relay circuit 10, separate analyzing circuits 28, as shown in the FIGURE, are connected in conjunction with each of the contacts 16, 18, 20 and 22. On initial closing of the contacts 24, which may be accomplished either manually or automatically by structure (not shown), the contacts 16, 18, 20 and 22 are closed due to energizing of their respective relay coils (not shown) and the contacts 16, 18, 20 and 22 are maintained closed by the seal contacts 26A, all in accordance with the usual operation of such circuits.

As the contacts 16 are picked up an electrical signal from the conductor 12 will be provided through the contacts 16, diodes 68, neon light 56, resistor 58 and resistor 70 to light the neon light 56. Subsequently, even if the contacts 16 drop out after initial picking up, the light 56 will stay on due to the signal provided thereacross through the resistance 64, diode 60, resistor 58 and resistor 70 connected between the conductors 12 and 14. Light 56 then will always indicate that the contacts 16 have initially picked up. Similar lights 56 will provide an indication of initial picking up of the contacts 18, 20 and 22.

Initially during picking up of the contacts 16, the neon light 74 cannot be turned on since each of the contacts 16, 18, 20, 22 and 24 must be closed before the relay coil 44 in circuit 42 is energized to close relay contacts 44A. After the series circuit 10 has been completed so that all of the lights 56 initially light, the contacts 44A and similar contacts in the analyzing circuits 28 associated with contacts 18, 20 and 22 are closed.

At this time the dropout circuit 72 is connected to the conductor 12 through the resistor 76, neon light 74, diode 86, contacts 44A and contacts 16. The neon light 74 will not therefore light. If however the contacts 16 drop out, the dropout circuit 72 is connected through the contacts 18, 20 and 22 and the sealing contacts 26A and coil 26 to the conductor 14. The voltage across the neon light 74 will at this time be sufficient to initially turn on the light 74. Also, all the lights 74 associated with contacts 16, 18, 20 and 22 will light since with the contacts 16 dropped out, the dropout circuits associated therewith will not be returned to the conductor 12 but will be returned to the conductor 14.

In this operation it will be noted that if the contacts 18, 20 or 22 had dropped out after initial closing rather than contacts 16, only the neon light associated with the dropped-out contacts and the neon lights associated with those contacts to the right of the dropped-out contacts in the FIGURE would light. The other contacts would still be returned to the conductor 12. Thus, it can be determined by inspecting the lights 74 which contacts dropped out to break the series relay circuit 10.

To ensure a return path to the conductor 14 for any circuit 72 associated with a dropped-out contact 16, 18, 20 or 22, on opening of the contacts, the relay coil 26 is chosen such that it has a slightly longer dropout time for the contacts 26A than the dropout time for the contacts, such as contacts 44A associated with the relay coil 44. Thus, the dropout time of the relay contacts 26A may be chosen to be 15 milliseconds, while the dropout time of the contacts 44A may be chosen to be 12 milliseconds.

From the above it will be readily seen that a simple, economical and efficient method of and structure for analyzing a series relay circuit to determine failure thereof has been provided. In addition, it will be seen that the analyzing circuit 28 and similar circuits associated with the contacts 18, 20 and 22 in the series relay circuit will indicate whether the failure of the series relay circuit has been due to failure of particular relay contacts to pickup or dropping out of the particular relay contacts after initial picking up.

While one embodiment of the present invention has been considered in detail, it will be understood that other embodiments and modifications are contemplated. It is the intention to include all embodiments and modifications as are defined by the appended claims within the scope of the invention.

What I claim for my invention is:

1. Monitoring structure for a plurality of relay contacts connected in series between a first and second conductor, which first and second conductors are connected to the opposite terminals of a source of electrical energy, comprising separate means, associated with each series connected relay for indicating initial closing of each of the series-connected contacts, connected between the conductors and to one side of the monitored series-connected contact associated therewith, each said separate means comprising a first circuit including first resistance means, a first diode and a first neon light connected in series with each other between the first and second conductors, said resistance means preventing initial illumination of the light due to the electrical signal between the first and second conductors but permitting continued illumination of the light due to the electrical signal between the first and second conductors after initial illumination thereof, and a second circuit including second resistance means, said first neon light and a second diode connected in series with each other and between the one side of the associated contact and the second conductor for initially illuminating the first light on closing of the contact associated therewith and all of the series connected contacts between the associated contact and the first conductor.

2. Structure as set forth in claim 1 and further comprising separate means, associated with each of the series-connected contacts for indicating the first contact of the series-connected contacts which opens after the series-connected contacts have all closed, connected between the first and second conductors and to the one side of the associated contact comprising a third circuit including third resistance means, a second neon bulb and a third diode connected in series between the first and second conductors, which third resistance means is sufficient to prevent initial illumination of the neon bulb due to the electric signal between the first and second conductors and is insufficient to prevent continued illumination of the second neon bulb due to the electric signal between the first and second conductors after initial illumination of the neon bulb, and a fourth circuit including fourth resistance means, the second neon bulb, a fourth diode and a separate relay contact connected in series between the first conductor and the one side of the associated series-connected contact, and relay coil means, for closing the separate relay contact on completing a circuit through the series-connected contacts, connected between the series-connected contacts and the second conductor.

3. Structure as set forth in claim 2, wherein the means for closing the separate relay contact further includes a holding contact in series with the series-connected contacts between the series-connected contacts and the first relay coil means for closing the separate contact and a second relay coil for maintaining the holding contact in a closed condition connected in parallel with the means for closing the separate relay contact having a dropout time with respect to the holding relay contact which is longer than the dropout time of the first relay coil with respect to the separate contact to insure lighting of all of the second neon lights in monitoring circuits subsequent to the initial contact in the series-connected contacts which has opened.

4. Monitoring structure for a plurality of relay contacts connected in series between a first and second conductor, which first and second conductors are connected to the opposite terminals of a source of electrical energy, comprising separate means, associated with each of the series-connected contacts for indicating the first contact of the series-connected contacts which opens after the series-connected contacts have all closed, connected between the first and second conductors and to one side of the associated contact comprising a first circuit including first resistance means, a neon bulb and a first diode connected in series between the first and second conductors, which first resistance means is sufficient to prevent initial illumination of the neon bulb due to the electric signal between the first and second conductors and is insufficient to prevent continued illumination of the neon bulb due to the electric signal between the first and second conductors after initial illumination of the neon bulb, and a second circuit including second resistance means, the neon bulb, a second diode and a separate relay contact connected in series between the first conductor and the one side of the associated series-connected contact, and relay coil means, for closing the separate relay contact on completing a circuit through the series-connected contacts circuit, connected between the series-connected contacts and the second conductor.

* * * * *